No. 615,296. Patented Dec. 6, 1898.
J. A. MOSHER.
PHOTOGRAPHIC SHUTTER.
(Application filed Jan. 26, 1898.)
(No Model.) 2 Sheets—Sheet I.
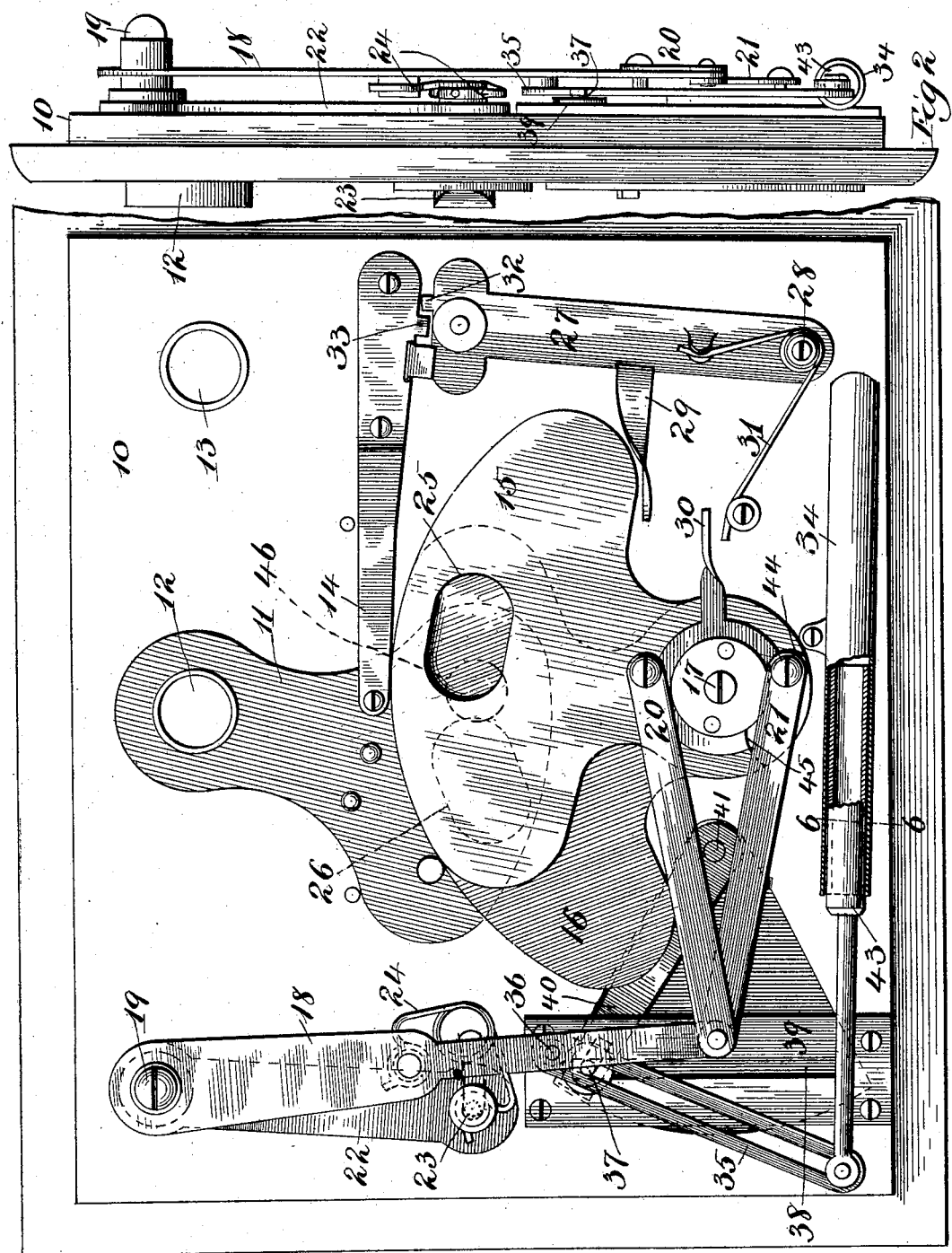
Witnesses
Inventor
John A. Mosher
By Louis K. Gillson
Atty.

No. 615,296. Patented Dec. 6, 1898.
J. A. MOSHER.
PHOTOGRAPHIC SHUTTER.
(Application filed Jan. 26, 1898.)
(No Model.) 2 Sheets—Sheet 2.
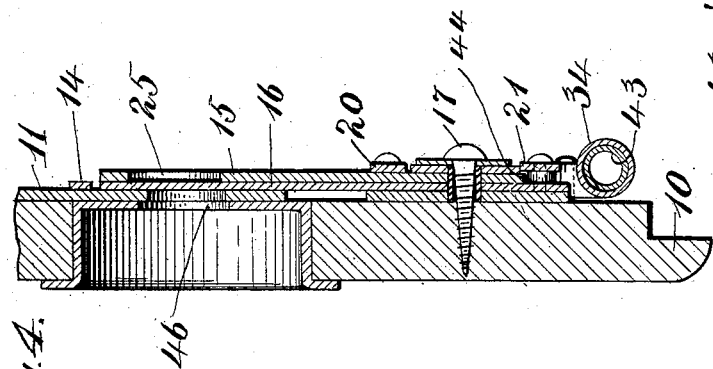
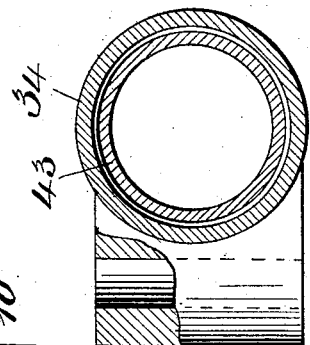
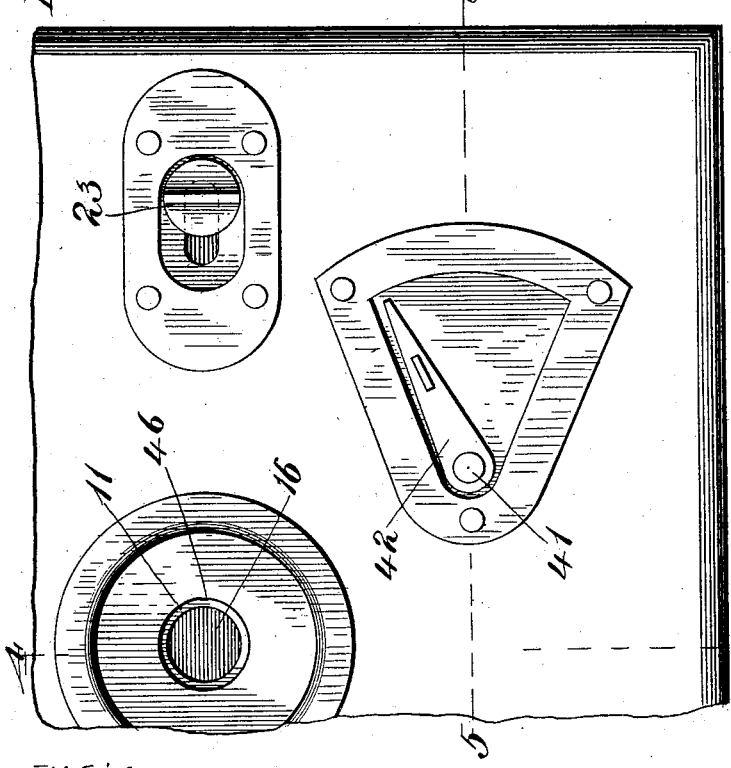
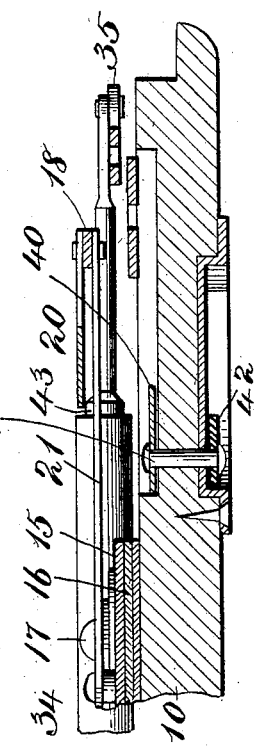
Witnesses Inventor

UNITED STATES PATENT OFFICE.

JOHN A. MOSHER, OF CHICAGO, ILLINOIS, ASSIGNOR TO THE ADAMS & WESTLAKE COMPANY, OF ILLINOIS.

PHOTOGRAPHIC SHUTTER.

SPECIFICATION forming part of Letters Patent No. 615,296, dated December 6, 1898.

Application filed January 26, 1898. Serial No. 668,088. (No model.)

*To all whom it may concern:*

Be it known that I, JOHN A. MOSHER, a citizen of the United States of America, and a resident of Chicago, county of Cook, and State of Illinois, have invented certain new and useful Improvements in Camera-Shutters, of which the following is a specification.

This invention relates to that class of camera-shutters which open from the center; and its object is to provide a shutter of this type which is always ready for action without being set or reversed, and in which the time of exposure may be varied.

The invention consists in the parts and arrangement of parts hereinafter fully described, and shown in the accompanying drawings, in which—

Figure 1 is an elevation, partly in section, of the shutter mechanism as mounted upon the inner face of the front plate of a camera. Fig. 2 is an edge elevation looking in the direction of the arrow 2 of Fig. 1. Fig. 3 is a detail front elevation of the exterior of the front plate of the camera. Fig. 4 is a sectional view on the line 4 4 of Fig. 3. Fig. 5 is a sectional view on the line 5 5 of Fig. 3; and Fig. 6 is a cross-section, upon an enlarged scale, on the line 6 6 of Fig. 1.

The front plate of the camera is designated in the drawings by the figure 10, and upon the inner face of this plate is mounted the shutter mechanism. I show in the drawings an oscillating diaphragm-plate 11, pivoted upon the tube of a finding-lens 12, a second finding-lens 13, and a frictional detent 14 for coöperating with the diaphragm-plate. These parts are not a part of the present invention, being shown in my Patent No. 611,190.

The shutter proper consists of two segmental oscillating plates 15 16, mounted pivotally upon a pin 17, common to both and actuated by a swinging arm 18, pendent from a pivot-pin 19 in the plate 10 and connected by means of the links 20 21 with the plates 15 16, the attachment of one of the links to one of the plates being upon one side of the pivot-pin 17 and that of the other link to the other plate being upon the opposite side of this pin, so that as the arm 18 swings it throws the shutter-plates in opposite directions. The arm 18 is manually controlled by means of an arm 22, swinging from the same pivot-pin 19 and being provided with a push-button 23, projecting outwardly through the plate 10. The two arms 18 and 22 are connected by an expanding-spring 24, the attachment of the spring to the arms being at differing distances from the center of movement, so that as the arm 22 swings past the arm 18 the direction of the pressure of the spring is reversed. This movement is also shown in my earlier patent above named.

The shutter-plates 15 16 are each perforated, as shown at 25 26, these perforations being so disposed that they will register simultaneously with the aperture 46 of the exposing-lens, and when the shutter-plates are at either of the extremes of their movements the lens-aperture is closed. It will be seen, therefore, that as the shutter-plates are thrown in opposite directions the lens-apertures are uncovered by the simultaneous passage therebefore of the apertures 25 26, and as the aperture of each shutter-plate is covered by a solid portion of the other plate until its advancing edge reaches the center of the lens-aperture the uncovering of the latter is from its center to its circumference and its closure is from its circumference to its center, as each of the shutter-apertures is again closed at the center of the lens-aperture by a solid portion of the other shutter-plate.

The throw of the shutter-plates is limited by the stop-shoulders 44 45, formed upon the heel of the plate 15, which is most remote from the plate 10, this heel portion being cut away to admit of the pivotal attachment of the link 21 to the heel of the plate 16.

For the purpose of providing for time exposures a detent is employed to stop the shutter-plates when their apertures are in full register with the aperture of the exposing-lens. Such a device is shown consisting of an arm 27, swinging upon a pivot-pin 28 and being controlled from the exterior of the camera by means of a push-button, (not shown,) an arm 29 projecting laterally from the arm 27, so as to cross the path of an arm 30, projecting radially from the pivot-pin 17 and moving with the shutter-plates. A spring 31 is provided for normally holding the detent out of service, and a lug 32 projects from the arm 27 and coöperates with the lug 33, which for convenience is formed upon a portion of the friction-detent 14 for the purpose of holding the detent 29 in its advanced position against the action of the spring 21.

For the purpose of providing for slow exposures the following mechanism is employed: An oscillating dash-pot 34, having its stem pivotally connected with a lever-arm 35, the remote end of which is pivotally attached to the arm 18, as shown at 36, the lever-arm 35 being provided with a movable fulcrum, consisting of the pin 37, projecting through a longitudinal slot in the lever-arm and being carried by a swinging arm 40, pivoted upon a pin 41, which projects through the plate 10 and is controlled by an arm 42.

In order that the shifting of the fulcrum-pin 37 may not disturb the arm 18, it also runs in a vertical groove 38 in a plate 39, secured to the plate 10, and its attachment to the arm 40 is by means of a longitudinal slot in the latter, within which it reciprocates as it is moved up and down in the slot 38. The shifting of the fulcrum-pin 37 changes the relative lengths of the two ends of the lever 35, and as the power end always has the same range of movement, being attached to the arm 18, the load end necessarily has its range of movement varied with the shifting of the fulcrum-pin, so that when the latter is in the position shown in Fig. 1 the load end of the lever swings through a long range of movement, while its movement is substantially nothing when the pin is brought to the lower end of the slot in the arm 35.

The plunger 43 of the dash-pot makes a loose fit with the barrel, so that the air may slowly pass it, the intervening space being, however, considerably exaggerated in the drawings, and it is made of considerable length also in order that the passage of the air may be retarded without necessitating so fine an adjustment as would be necessary with a short plunger. The plunger is chambered from its inner end, as shown, so that a considerable quantity of air is inclosed, even though the plunger is inserted to the inner end of the barrel, thereby preventing the rebound that would occur were a small quantity of air suddenly compressed.

The shutter-plates 15 16 are made of any light thin opaque material, sheet metal being preferred. The apertures 25 26 may be of any preferred shape. I prefer to make them oblong, as shown, in order that the exposure may not be too brief, and by rounding their ends the opening and closing of the lens-aperture is approximately radial in all directions.

I am aware that oscillating shutter-plates have been used in pairs, each plate being apertured and the plates being moved in opposite directions, so as to cause their apertures to register at each movement; but, so far as I am aware, I am the first to employ this construction in combination with means for so oscillating the plates that an exposure may be made at each registry of their apertures or, in other words, I believe that such arrangement of plates has never before been employed in such manner that the shutter is always ready for an exposure without resetting, all known shutters of this type being actuated for exposure from one position only, it being necessary to return the plates to this position between successive exposures.

While I show the plates as oscillating from a common center of movement, I do not desire to be limited to this construction, as my invention broadly includes any shutter in which a pair of overlapping apertured plates is used, so mounted that at each movement their apertures register, whereby at each half beat or oscillation an exposure may be effected.

I claim as my invention—

1. In a camera-shutter, the combination with a pair of opaque plates mounted to oscillate upon a common center and having apertures equidistant from such center, of a pair of links leading from such plates but attached thereto upon opposite sides of their pivot, an expanding-spring having one of its ends connected with such links, a manually-controlled reciprocating stud attached to the opposite end of such spring, the spring being so mounted that its two ends reciprocate upon different lines and the path of the manually-controlled end overlaps the path of the opposite end in both directions.

2. In a camera-shutter, the combination with a pair of opaque plates mounted to oscillate upon a common center and having apertures equidistant from such center, of a pair of arms, 18 and 22, swinging from a common center, an expanding-spring connecting such arms and attached thereto at different distances from their pivot, a pair of links leading from the arm 18 to the opaque plates and being attached thereto upon opposite sides of their pivot, means for oscillating the arm 22 and for moving it through a wider angle than the range of movement of the arm 18.

3. In a camera-shutter, the combination with a pair of opaque plates mounted to oscillate from a common center, and having apertures equidistant from such center, of two reciprocating members having non-coincident paths of differing lengths; connection between one of such members and each of the plates, the points of attachment to the plates being upon opposite sides of their pivot; and a compressible expansion-spring having its ends attached respectively to such reciprocating members.

4. In a camera-shutter, the combination with a pair of opaque plates mounted to oscillate upon a common center and having registering apertures, of an oscillating actuating-arm, links leading from such arm to the two plates and attached to the latter upon opposite sides of their pivot, a dash-pot, a lever for actuating the plunger of the dash-pot and being actuated by the oscillating arm, and a movable fulcrum for such lever.

5. In a camera-shutter, the combination with an oscillating apertured plate, of an oscillating actuating-arm, a link connecting the arm with the plate, a dash-pot, a lever for actuating the plunger of the dash-pot and being actuated by the oscillating arm, and a movable fulcrum for such lever.

6. In a camera-shutter, the combination with an oscillating apertured plate, of an oscillating actuating-arm, a link connecting the arm with the plate, a longitudinally-slotted lever-arm for actuating the dash-pot plunger, and being actuated by the oscillating arm, a second oscillating arm, 40, and a pin carried by the arm 40 and passing through the slot of the lever-arm and forming the fulcrum for such lever.

7. In a camera-shutter, the combination with an oscillating apertured plate, of an oscillating actuating-arm, 18, a reciprocating pin, an expanding-spring attached at one end to such pin and at the other end to the arm 18, a link connecting the arm with the plate, a dash-pot, a lever for actuating the plunger of the dash-pot and being actuated by the oscillating arm, and a movable fulcrum for such lever.

8. In a camera-shutter, the combination with an oscillating apertured plate, of an oscillating actuating-arm, 18, a reciprocating pin, an expanding-spring attached at one end to such pin and at the other end to the arm 18, a link connecting the arm with the plate, a longitudinally-slotted lever-arm for actuating the dash-pot plunger, and being actuated by the oscillating arm, a second oscillating arm, 40, and a pin carried by the arm 40 and passing through the slot of the lever-arm and forming the fulcrum for such lever.

9. In a camera-shutter, the combination with an oscillating plate, an oscillating actuating-arm, 18, and connection between the arm and the plate, of a dash-pot, a longitudinally-slotted arm, 35, having its ends pivotally connected respectively with the dash-pot plunger and the arm, 18, an oscillating arm, 40, having a longitudinal slot, a fixed plate having a slot lying on a chord of an arc described by the movement of the arm 40, and a pin fitting loosely in the slots of the arms, 35 and 40, and of the fixed plate.

10. In a camera-shutter, the combination with a pair of plates mounted to oscillate upon a common center, and having apertures adapted to register as the plates oscillate, and lens-covering portions at each side of such apertures; of means for simultaneously throwing the plates in opposite directions from each position of rest, whereby a plate-exposure may be made each time the plate-apertures register.

11. In a camera-shutter, the combination with a pair of overlapping oscillating plates arranged to move in opposite directions and having apertures adapted to register as the plates oscillate, each of the plates having lens-covering portions at each side of its aperture, of means for throwing such plates from each position of rest and causing their apertures to move in opposite directions, whereby a plate-exposure may be made each time the plate-apertures register.

12. In a camera-shutter, the combination with a pair of oscillating plates having apertures adapted to register, of a reciprocating push-button, and means for connecting the button with the plates so that it throws them in opposite directions, and means for holding the parts at rest at the end of each half-cycle of movement, whereby the shutter may be actuated for an exposure alternately in opposite directions.

13. In a camera-shutter, the combination with a pair of oscillating plates having apertures adapted to register, of a reciprocating push-button, and means for connecting the button with the plates so that it throws them in opposite directions, and means for holding the parts at rest at the end of each half-cycle of movement, whereby the shutter may be actuated for an exposure alternately in opposite directions, and means acting upon the plates independently of the button whereby their speed of travel may be varied.

14. In a camera-shutter, the combination with the plates, 15, 16, mounted to oscillate from a common center, and having apertures adapted to register, of the swinging arms 18 and 22, the expansion-spring 24 having its ends attached respectively to said arms, link-bars, 20 and 21, leading from the arm 18 to each one of the shutter-plates and being attached thereto upon opposite sides of their center of movement, the dash-pot 34, the longitudinally-slotted lever-arm 35 attached to the stem of the dash-pot plunger and the arm 18, the fulcrum-pin 37 adapted to slide in the slot of the lever-arm 35, and the oscillating arm 40 carrying the pin 37, all substantially as described and for the purpose specified.

JOHN A. MOSHER.

Witnesses:
 HESTER B. BAIRD,
 LOUIS K. GILLSON.